US011104206B2

(12) United States Patent
Blaschke et al.

(10) Patent No.: US 11,104,206 B2
(45) Date of Patent: Aug. 31, 2021

(54) VEHICLE HEATER

(71) Applicant: Eberspächer Climate Control Systems GmbH, Esslingen (DE)

(72) Inventors: Walter Blaschke, Deizisau (DE);
Andreas Collmer, Aichwald (DE);
Michael Haefner, Stuttgart (DE)

(73) Assignee: Eberspächer Climate Control Systems GmbH, Esslingen (DE)

( * ) Notice: Subject to any disclaimer, the term of this patent is extended or adjusted under 35 U.S.C. 154(b) by 117 days.

(21) Appl. No.: 16/180,366

(22) Filed: Nov. 5, 2018

(65) Prior Publication Data
US 2019/0135076 A1    May 9, 2019

(30) Foreign Application Priority Data

Nov. 6, 2017   (DE) .................... 10 2017 125 783.7

(51) Int. Cl.
*B60H 1/22*      (2006.01)
*F24H 1/00*      (2006.01)
(Continued)

(52) U.S. Cl.
CPC ............. *B60H 1/2212* (2013.01); *F23D 3/40* (2013.01); *F24H 1/009* (2013.01);
(Continued)

(58) Field of Classification Search
CPC .......... B60H 1/2212; B60H 2001/2271; B60H 2001/2281; B60H 2001/2284;
(Continued)

(56) References Cited

U.S. PATENT DOCUMENTS 2,726,042 A  * 12/1955  Baier ..................... B60H 1/032
                                                     237/12.3 C
3,094,979 A  *  6/1963  Volbehr ............... B60H 1/2203
                                                     126/110 R
(Continued)

FOREIGN PATENT DOCUMENTS

DE           2432850 A1 *  1/1976  ............... B60H 1/22
DE       33 10 501 A1    10/1984
(Continued)

OTHER PUBLICATIONS

"DE_3509346_A_M—Machine Translation.pdf", machine translation, EPO.org., Aug. 12, 2020.*
(Continued)

*Primary Examiner* — Steven B McAllister
*Assistant Examiner* — Daniel E. Namay
(74) *Attorney, Agent, or Firm* — McGlew and Tuttle, P.C.

(57) ABSTRACT

A vehicle heater includes a combustion chamber assembly unit (18) to be fed with fuel and combustion air, a housing (22) with a circumferential wall (24) defining a combustion air flow space (26), a combustion air blower (30) adjoining an end face (28) of the circumferential wall (24) of the housing (12) in the direction of a housing longitudinal axis (L), a fuel feed line and a sealing formation with a first sealing formation area arranged between the end face (28) of the circumferential wall (24) and the blower housing (32). A second sealing formation area (62) is positioned to mesh with a fuel feed line passage opening (38) for establishing a closure between the circumferential wall (24) and the fuel feed line (36). The sealing formation (56) includes a sealing element (54) providing the first sealing formation area (58) and the second sealing formation area (62).

17 Claims, 6 Drawing Sheets

(51) Int. Cl.
*F23D 3/40* (2006.01)
*F24H 3/06* (2006.01)
*F24H 9/02* (2006.01)

(52) U.S. Cl.
CPC ............... *B60H 2001/2271* (2013.01); *B60H 2001/2281* (2013.01); *B60H 2001/2284* (2013.01); *F23D 2900/21002* (2013.01); *F24H 3/065* (2013.01)

(58) Field of Classification Search
CPC ....... F23D 2202/00; F23D 2900/21002; F23D 2900/14001; F24H 3/065; F24H 3/087; F24H 3/105; F24H 9/02
USPC ..................................................... 237/12.3 C
See application file for complete search history.

(56) References Cited

U.S. PATENT DOCUMENTS

| | | | | |
|---|---|---|---|---|
| 3,159,201 | A * | 12/1964 | Hottenroth | B60H 1/2203 431/259 |
| 4,519,375 | A * | 5/1985 | Galtz | B60H 1/2212 126/110 B |
| 4,530,658 | A * | 7/1985 | Panick | F24H 3/065 126/116 R |
| 4,688,718 | A * | 8/1987 | Galtz | B60H 1/2212 126/110 B |
| 4,923,033 | A * | 5/1990 | Panick | B60H 1/2212 126/116 R |
| 5,456,408 | A * | 10/1995 | Appel | B60H 1/2206 237/12.3 C |
| 5,727,730 | A * | 3/1998 | Habijanec | B60H 1/2212 126/110 A |
| 5,738,506 | A * | 4/1998 | Mosig | B60H 1/2203 237/12.3 C |
| 6,540,150 | B1 * | 4/2003 | Eberspach | F24H 9/2085 126/110 B |
| 6,726,114 | B2 * | 4/2004 | Blaschke | B01B 1/005 237/2 R |
| 6,743,012 | B2 * | 6/2004 | Wolf | B60H 1/2212 165/41 |
| 6,926,206 | B2 * | 8/2005 | Schlecht | B60H 1/2212 165/41 |
| 7,434,746 | B2 * | 10/2008 | Schlecht | B60H 1/2203 165/41 |
| 9,764,619 | B2 * | 9/2017 | Humburg | F24H 9/2035 |
| 10,684,008 | B2 * | 6/2020 | Kido | F23Q 7/08 |
| 2002/0117551 | A1 * | 8/2002 | Wolf | B60H 1/2212 237/12.3 C |
| 2003/0027090 | A1 * | 2/2003 | Blaschke | B01B 1/005 431/243 |
| 2003/0173413 | A1 * | 9/2003 | Schlecht | B60H 1/2212 237/12.3 C |
| 2005/0260530 | A1 * | 11/2005 | Schlecht | B60H 1/2203 431/261 |
| 2006/0151623 | A1 * | 7/2006 | Haefner | F24H 3/065 237/12.3 C |
| 2008/0017359 | A1 * | 1/2008 | Ludwig | F28F 1/02 165/138 |
| 2008/0093063 | A1 * | 4/2008 | Ludwig | F28F 1/02 165/179 |
| 2008/0128525 | A1 * | 6/2008 | Ludwig | B60H 1/2212 237/12.3 A |
| 2008/0201948 | A1 * | 8/2008 | Ludwig | F28F 1/02 29/890.03 |
| 2014/0134559 | A1 * | 5/2014 | Humburg | F24H 1/124 432/247 |
| 2017/0267064 | A1 * | 9/2017 | Brandt | B60H 1/2206 |
| 2020/0055374 | A1 * | 2/2020 | Collmer | B60H 1/2206 |

FOREIGN PATENT DOCUMENTS

| | | | | |
|---|---|---|---|---|
| DE | 35 09 346 A1 | | 9/1986 | |
| DE | 3509349 A1 | * | 9/1986 | ............... F28F 1/42 |
| DE | 4311080 C1 | * | 3/1994 | ........... B60H 1/2206 |
| DE | 10009820 A1 | * | 9/2001 | ........... F23M 20/005 |
| DE | 100 58 794 A1 | | 6/2002 | |
| DE | 101 36 292 A1 | | 2/2003 | |
| DE | 10 2013 002046 B3 | | 2/2014 | |
| DE | 102017125783 A1 | * | 5/2019 | ............. F24H 1/009 |
| EP | 3 091 306 A1 | | 11/2016 | |
| EP | 3480519 A1 | * | 5/2019 | ............. F24H 1/009 |
| FR | 1571918 A | * | 6/1969 | ............. F02N 19/10 |
| GB | 1198869 A | * | 7/1970 | ........... B60H 1/2212 |
| JP | 53069336 A | * | 6/1978 | ........... B60H 1/2203 |
| SU | 232041 A1 | | 3/1969 | |
| WO | 2016/195046 A1 | | 12/2016 | |

OTHER PUBLICATIONS

"DE_102013002046_B3_M—Machine Translation.pdff", machine translation, EPO.org., Aug. 12, 2020.*

"JP_53069336_A_M—Google Translate.pdf", Google.com, Aug. 12, 2020.*

\* cited by examiner

VEHICLE HEATER

CROSS REFERENCE TO RELATED APPLICATIONS

This application claims the benefit of priority under 35 U.S.C. § 119 of German Application 10 2017 125 783.7, filed Nov. 6, 2017, the entire contents of which are incorporated herein by reference.

TECHNICAL FIELD

The present invention pertains to a fuel-operated vehicle heater.

BACKGROUND

A fuel-operated vehicle heater may be configured such that a combustion chamber assembly unit can be carried on a heat exchanger housing, around which air to be heated can flow on an outer side thereof. Combustion air and liquid fuel are fed to the combustion chamber assembly unit and mixed in a combustion chamber. Combustion waste gas, which flows along the inner side of the heat exchanger housing and transfers heat to this in the process, is formed during the combustion of the mixture thus formed.

A housing, which forms, for example, a part of the heat exchanger housing, defines with a circumferential wall a combustion air flow space, in which the combustion air delivered by a combustion air blower can flow to the combustion chamber assembly unit. The combustion air blower has a blower housing, which is positioned adjacent to an end face of the circumferential wall and is permanently connected in this area to the housing and to the heat exchanger housing, so that the combustion air flow space, which is open, in principle, to the combustion air blower in the direction of a housing longitudinal axis, is covered by the combustion air blower and is thus closed in this direction.

To make it possible to deliver the liquid fuel necessary for the combustion in the direction of the combustion chamber assembly unit, a fuel feed line adjoining the combustion chamber assembly unit extends through the combustion air flow space and passes through a fuel feed line passage opening formed in the circumferential wall. A sealing formation is provided in order to achieve an essentially fluid-tight connection both in the area of the fuel feed line passage opening and in the area in which the housing adjoins the blower housing.

SUMMARY OF THE INVENTION

An object of the present invention is to configure a vehicle heater such that reliable closure of a combustion air flow space can be guaranteed with a configuration that can be embodied in a simple manner.

This object is accomplished according to the present invention by a vehicle heater comprising
 a combustion chamber assembly unit to be fed with fuel and combustion air,
 a housing defining a combustion air flow space with a circumferential wall,
 a combustion air blower adjoining an end face of the circumferential wall of the housing in the direction of a housing longitudinal axis for delivering combustion air into the combustion air flow space,
 a fuel feed line adjoining the combustion chamber assembly unit for feeding fuel to the combustion chamber assembly unit, wherein a fuel feed line passage opening open towards the end face of the circumferential wall is provided in the circumferential wall, and
 a sealing formation with a first sealing formation area, wherein the first sealing formation area for establishing an essentially fluid-tight closure between the end face of the circumferential wall and a blower housing of the combustion air blower is arranged between the end face of the circumferential wall and the blower housing, and with a second sealing formation area, wherein the second sealing formation area is positioned such that it meshes with the fuel feed line passage opening to establish an essentially fluid-tight closure between the circumferential wall and the fuel feed line, wherein the sealing formation comprises a sealing element providing the first sealing formation area and the second sealing formation area.

Since the sealing element essentially providing the sealing formation has, in the vehicle heater configured according to the present invention, both the first sealing formation area and the second sealing formation area as integral components thereof, the operation of assembling a vehicle heater according to the present invention is simplified, on the one hand. On the other hand, a reliable fluid-tight closure is guaranteed by the integral configuration of these sealing formation areas as parts of the sealing elements where the fuel feed line passage opening is open towards the end face of the circumferential wall and the two sealing formation areas thus adjoin each other.

Since the circumferential wall closes the combustion air flow space, in general, radially outwardly and thus surrounds same in a ring-shaped configuration, it is further provided that the first sealing formation area be formed in a ring-shaped configuration, adapted to a circumferential contour of the circumferential wall.

The second sealing formation area may extend, to establish a reliable connection to the circumferential wall, projecting from the first sealing formation area essentially in the direction of the housing longitudinal axis and meshing with the fuel feed line passage opening and may have an outer circumferential contour adapted to a contour of the fuel feed line passage opening.

For the passage of the fuel feed line through the second sealing formation area, the latter may have an opening, through which the fuel feed line passes.

There is a risk under various operating conditions that unburned liquid fuel escapes from the combustion chamber assembly unit and collects in the combustion air flow space. Especially if a vehicle heater is installed in a vehicle such that the fuel feed line passage opening is positioned at the bottom in a vertical direction, such liquid fuel will collect in the area of the fuel feed line passage opening, i.e., in the area of the second sealing formation area. Since it cannot be ruled out completely, especially in a vehicle heater remaining in such a state over a rather long time, that at least small quantities of fuel will pass through especially where the second sealing formation area adjoins the fuel feed line, it is provided according to another aspect of the present invention that a buffer chamber be provided on an outer side of the circumferential wall, the buffer chamber on the end face of the circumferential wall being open in the direction of the housing longitudinal axis and being defined radially inwardly by the circumferential wall and radially outwardly and in the circumferential direction by a buffer chamber wall adjoining the circumferential wall, wherein an opening, through which the fuel feed line passes, is provided in the buffer chamber wall, and that the second sealing formation area establish an essentially fluid-tight closure between the buffer chamber and the combustion air flow space in the area of the circumferential wall. Liquid fuel can collect in such a buffer chamber and be released in a defined manner to the surrounding area, without there being a risk that the liquid fuel can enter the stream of the air to be introduced in a heated state into the interior space of the vehicle.

In order to guarantee an essentially fluid-tight connection to the blower housing even where the buffer chamber is formed, it is provided that the sealing formation have a third sealing formation area, wherein the third sealing formation area is arranged between the buffer chamber wall and the blower housing in order to establish an essentially fluid-tight closure between the buffer chamber wall and the blower housing.

In an especially advantageous embodiment, the sealing element has the third sealing formation area in such a configuration. This also contributes to a configuration that can be embodied in a simple manner and functions reliably.

The sealing element is preferably made of an elastomeric material. Since the sealing element may come into contact with the liquid fuel, which is to be fed to the combustion chamber assembly unit, i.e., for example, gasoline or diesel fuel, fuel-resistant material is used in another preferred manner to manufacture the sealing element.

It is provided, for an even more simplified configuration, that the housing be part of a heat exchanger housing and that the combustion chamber assembly unit be carried on a bottom area of the heat exchanger housing. In particular, the heat exchanger housing with the housing forming a part thereof may be manufactured as a cast metal component.

The present invention will be described below in detail with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Referring to the drawings, a fuel-operated vehicle heater is generally designated by 10 in the figures. The vehicle heater 10 comprises a heat exchanger housing, generally designated by 12, which has a plurality of heat transfer ribs 14 on its outer side in order to transfer heat to the air flowing around the heat exchanger housing 12. A combustion chamber assembly unit, generally designated by 18, is carried permanently on a bottom area 16 of the heat exchanger housing 12, for example, a screw connection. The combustion chamber assembly unit 18 comprises a combustion chamber to be fed with combustion air and fuel. A waste gas, which flows along the inner side of the heat exchanger housing and transfers heat to the heat exchanger housing in the process, is formed during the combustion of the mixture thus formed. The waste gas leaves the inner space enclosed by the heat exchanger housing 12 via a waste gas outlet pipe 20.

A housing 22 adjoining the bottom area 16 forms an integral part of the heat exchanger housing in the exemplary embodiment shown. The housing 22 encloses with a circumferential wall 24 thereof a combustion air flow space 26, which is generally also called plenum. The combustion air to be burned together with liquid fuel in the combustion chamber assembly unit 18 flows through this combustion air flow space 26. The combustion air is delivered by a combustion air blower 30 positioned such that it adjoins an end face 28 of the circumferential wall 24. The combustion air blower 30, shown only partially in the figures, is configured, for example, as a side channel blower and comprises a blower housing 32, which, facing in its outer circumferential area the end face 28 of the circumferential wall 24 with a sealing surface 34 formed there, is permanently connected in this position to the housing 22 or to the circumferential wall thereof, for example, by a screw connection.

To feed liquid fuel to the combustion chamber assembly unit 18, a fuel feed line 36 adjoins the combustion chamber assembly unit 18. To make it possible to pass the fuel feed line 36 through the combustion air flow space 26 to the combustion chamber assembly unit 18, a fuel feed line passage opening 38 is formed in the circumferential wall 24 of the housing 22. This is open in the direction of a housing longitudinal axis L to the end face 28 of the circumferential wall 24.

A buffer chamber 40 is provided in the circumferential area, in which the fuel feed line passage opening 38 is formed in the circumferential wall 24, on the outer side of the circumferential wall 24, i.e., on the side of the circumferential wall 24 facing away from the combustion air flow space 26. The buffer chamber 40 is open to the outside, i.e., on its side facing away from the circumferential wall 24, and is defined in the circumferential direction by a buffer chamber wall 42 and is open in the direction of the end face 28 of the circumferential wall 24. As can be seen, for example, in FIG. 2, an opening, through which the fuel feed line 36 is led to the outside, is formed in the buffer chamber wall 42. The opening 44, through which the fuel feed line 36 passes, is also open in the direction of the end face 28 of the circumferential wall 24, so that when the combustion chamber assembly unit 18 is installed in the heat exchanger housing 12, the fuel feed line 36, already connected to the combustion chamber assembly unit 18, can be axially inserted into the fuel feed line passage opening 38 and the opening 44 in the buffer chamber wall 42.

A foot-like mounting area 46, with which the vehicle heater 10 can be positioned, via the intermediary of a washer-type seal 48 and adjoining the vehicle heater 10, on a, for example, plate-shaped carrier 50 of a vehicle and can be fixed thereon, is formed integrally with the heat exchanger housing 12 in the area of the heat exchanger housing 12 and of the housing 22 formed integrally therewith, in which the fuel feed line passage opening 38 and also the buffer chamber 40 are formed. Openings are provided in this plate-shaped carrier 50 for the passage of the waste gas outlet pipe 20, of the fuel feed line 36 and of a combustion air feed pipe 52 of the combustion air blower 30.

Figure 6:
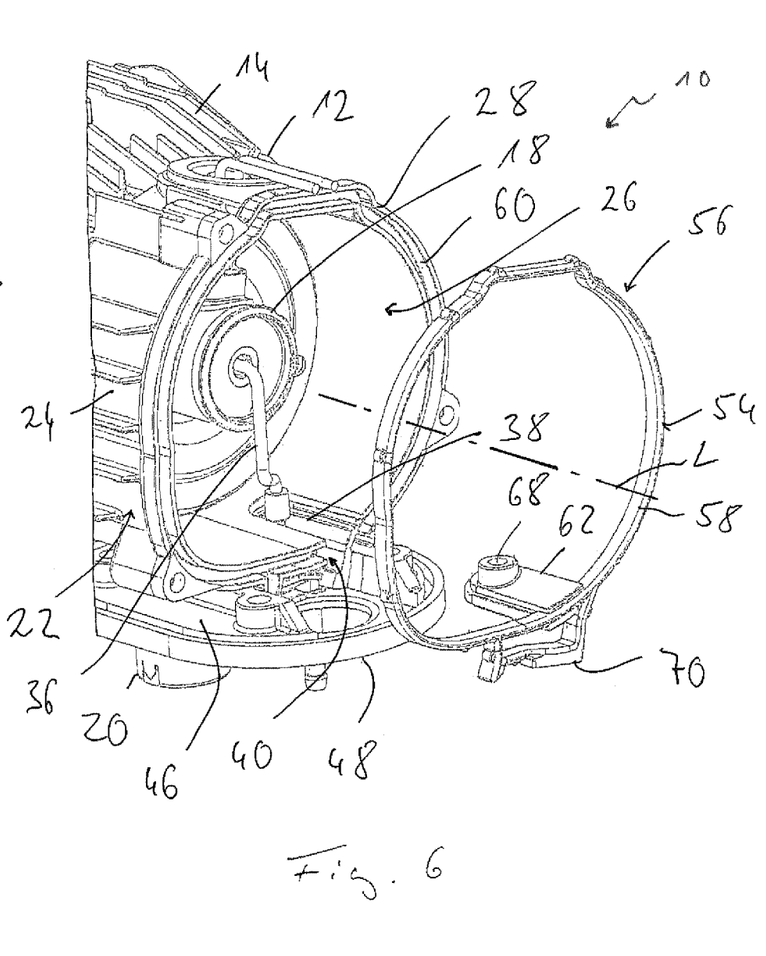
FIG. 6 is a partial perspective view of the heat exchanger housing shown in FIG. 5 with a combustion chamber assembly unit carried thereon and with a sealing element.
Figure 7:
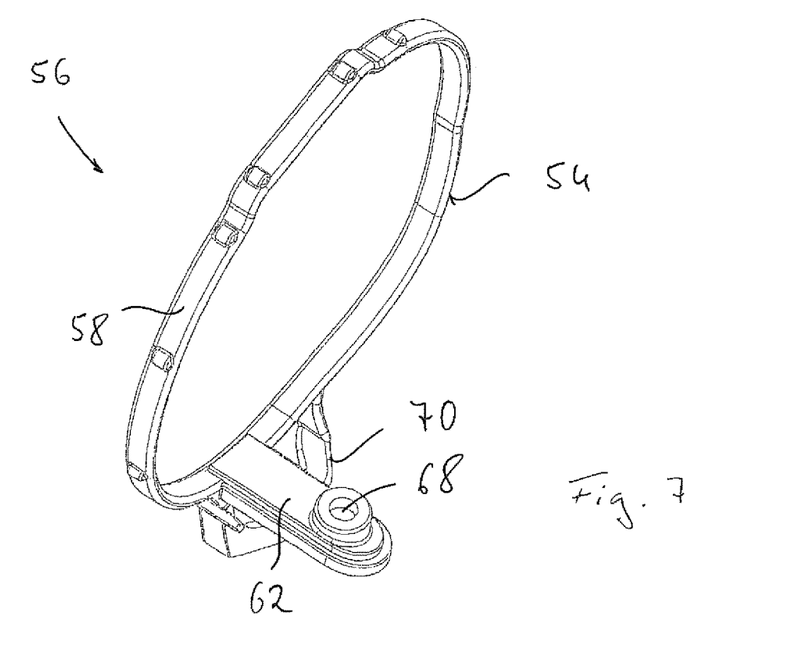
FIG. 7 is a perspective view showing the sealing element according to FIG. 6.
Figure 8:
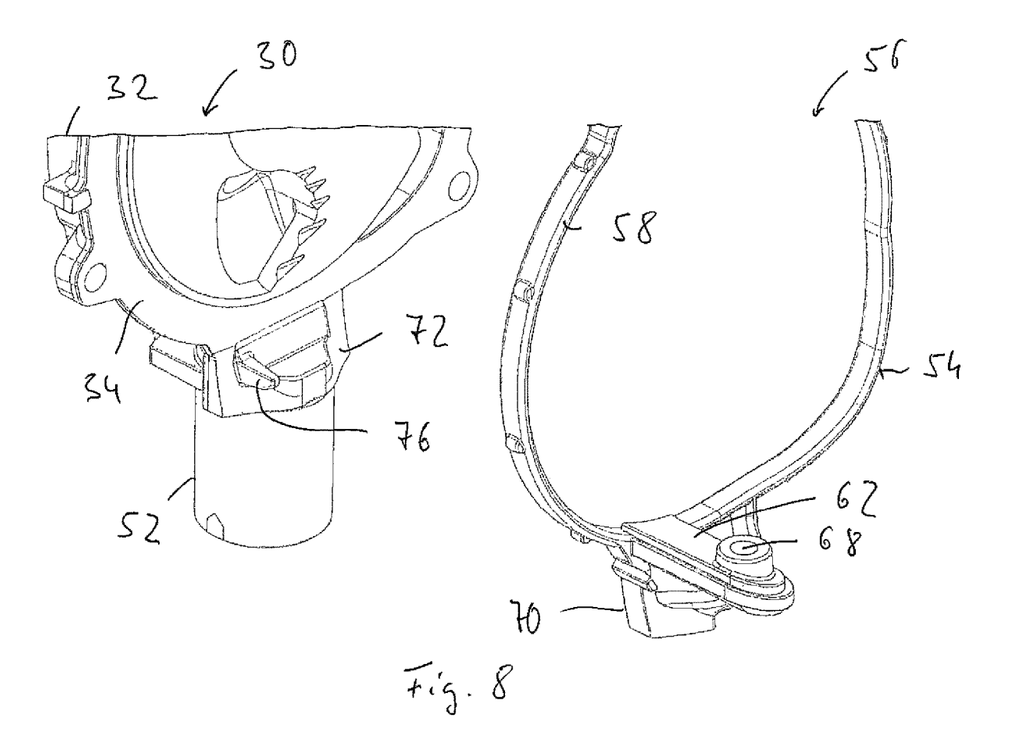
FIG. 8 is a partial perspective exploded view showing the sealing element according to FIG. 7 in conjunction with a combustion air blower.

To guarantee a tight closure of the combustion air flow space 26, a sealing formation 56, formed by a sealing element 54 from a fuel-resistant elastomeric material, is provided. The sealing formation 56 comprises an essentially ring-shaped first sealing formation area 58, which is inserted between the end face 28 of the circumferential wall 24, especially into a groove 60 provided there, and the sealing surface 34 of the blower housing 32. When the blower housing 32 is screwed onto the housing 22, the sealing element 54 or the first sealing formation area 58 thereof is compressed, for example, until the sealing surface 34 is located at the end face 28 of the circumferential wall 24. Excessive tension of the first sealing formation area 58 is avoided in this manner. As is clearly seen in FIG. 6, this first sealing formation area 58 is adapted in terms of its ring-shaped form to the circumferential contour of the circumferential wall 24.

To achieve tight closure of the fuel feed line passage opening 38, a second sealing formation area 62 is provided as an integral part of the sealing element 54. This sealing formation area projects from the ring-shaped first sealing formation area 58 in the direction of the housing longitudinal axis L, so that it is positioned such that it meshes with the fuel feed line passage opening 38 when the first sealing formation area 58 is positioned at the end face 28 of the circumferential wall 24. It is seen in the figures that the second sealing formation area 62 has an outer circumferential contour, which is adapted to the contour of the fuel feed line passage opening 38, so that the outer circumference of the second sealing formation area 62 is positioned such that it meshes with a groove area 66 on the inner circumference of the fuel feed line passage opening 38 under a slight prestress with a spring area 64 surrounding this outer circumference.

Figure 1:
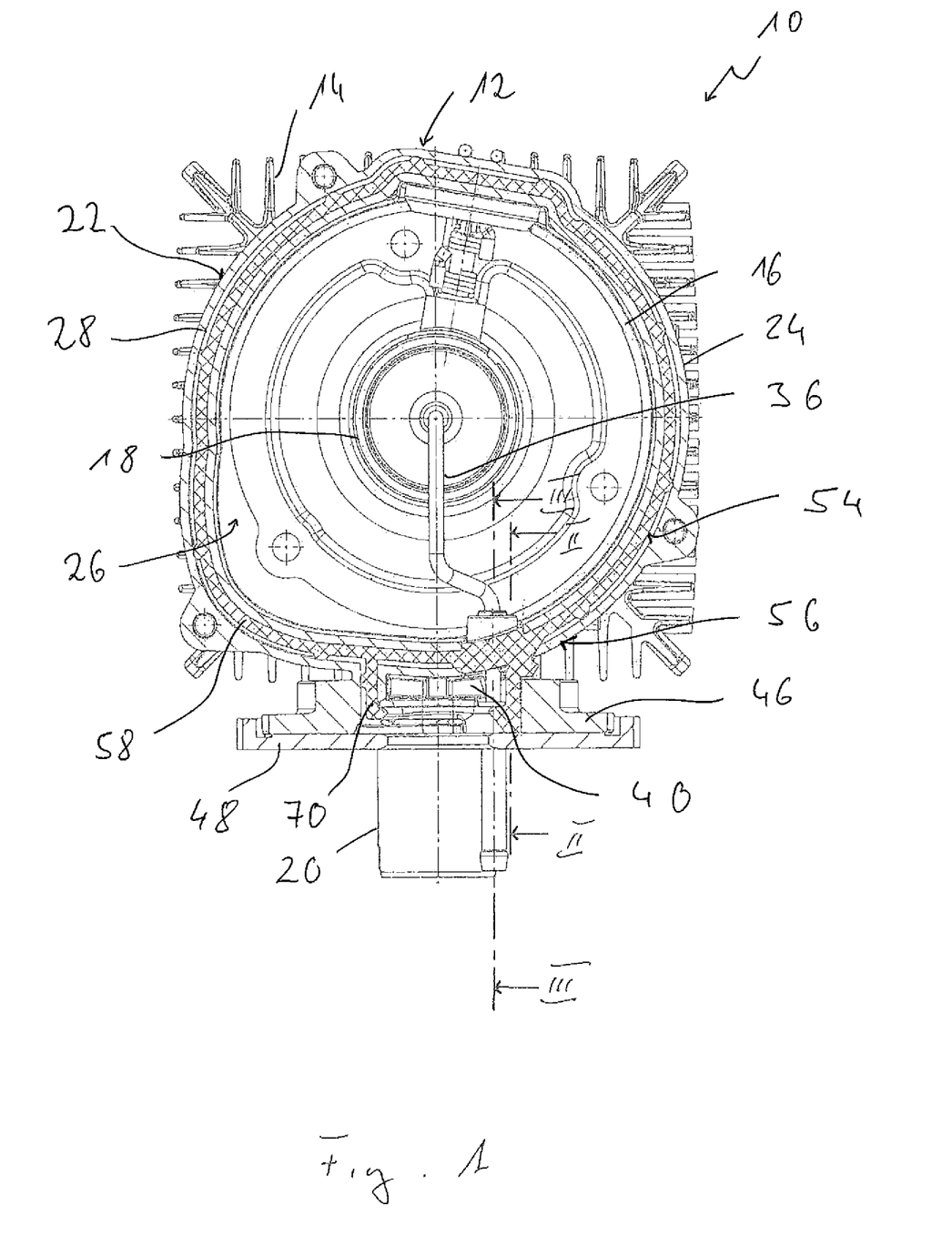
FIG. 1 is a cross-sectional view of a vehicle heater, cut along a line I-I in FIG. 2.
Figure 2:
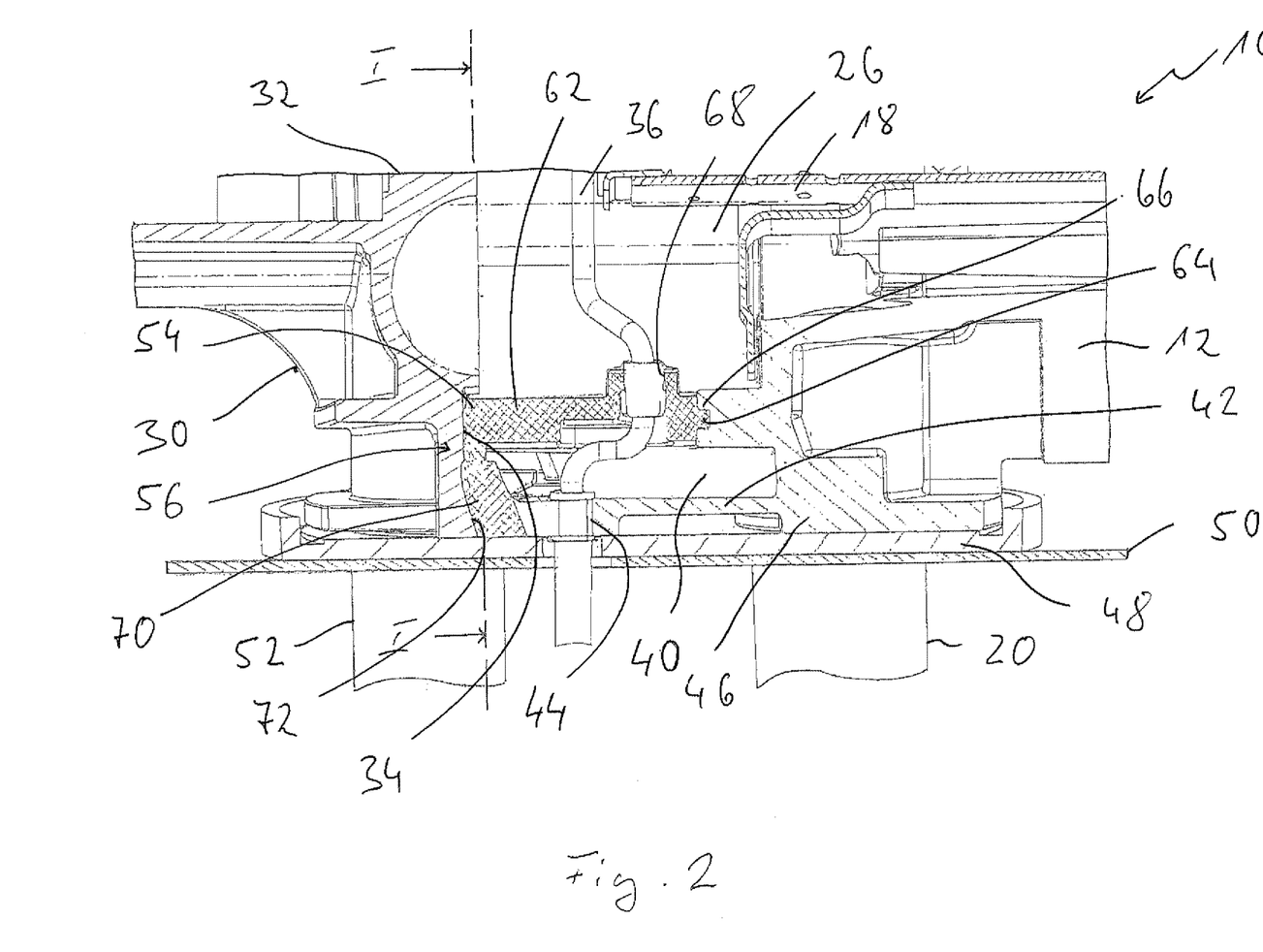
FIG. 2 is a partial longitudinal sectional view of the vehicle heater according to FIG. 1, cut along a line II-II in FIG. 1.
Figure 3:
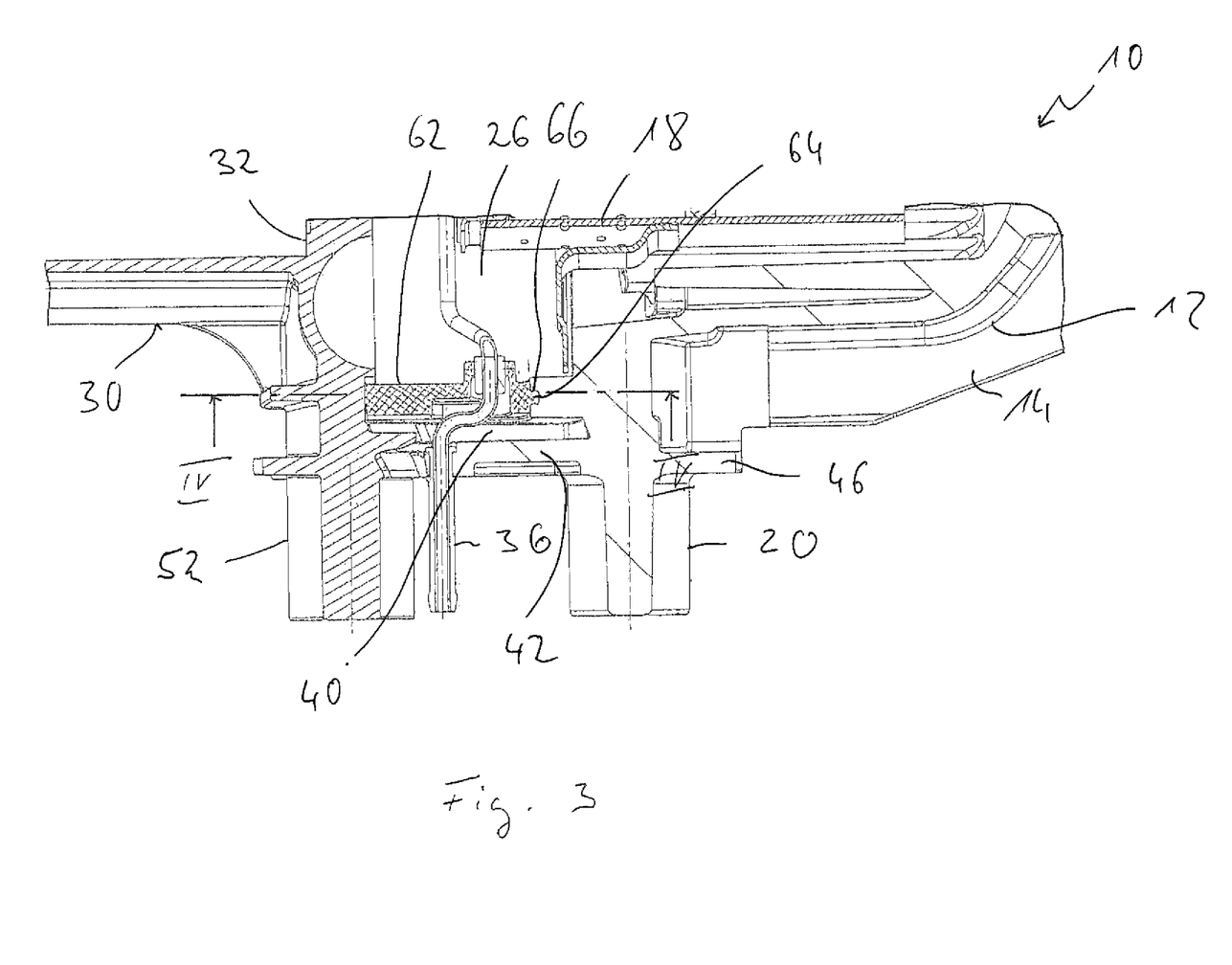
FIG. 3 is a partial longitudinal section view of the vehicle heater according to FIG. 1, which view corresponds to FIG. 2, along a line III-III in FIG. 1.
Figure 4:
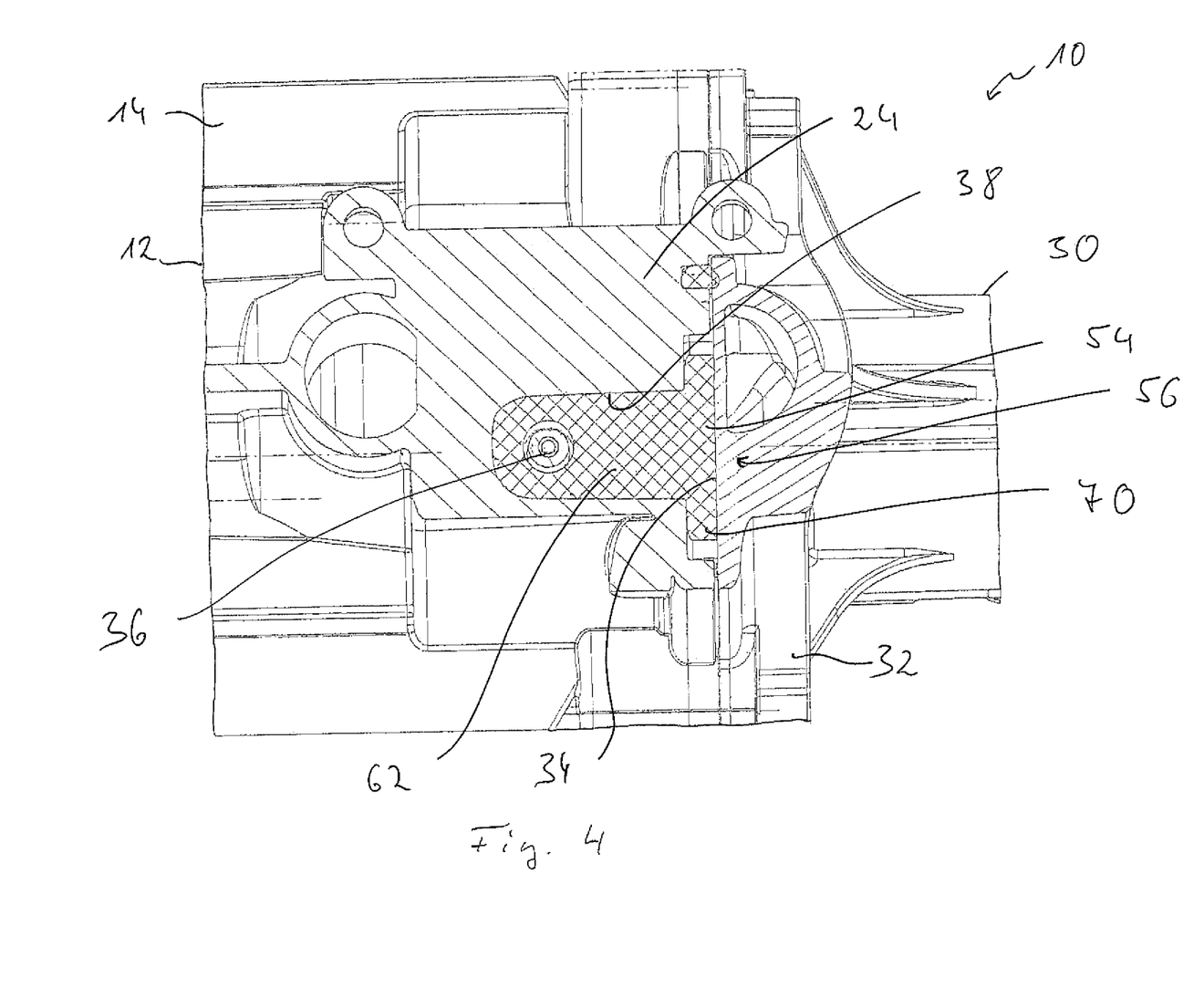
FIG. 4 is a partial longitudinal sectional view of the vehicle heater according FIG. 1, cut along a line IV-IV in FIG. 3.
Figure 5:
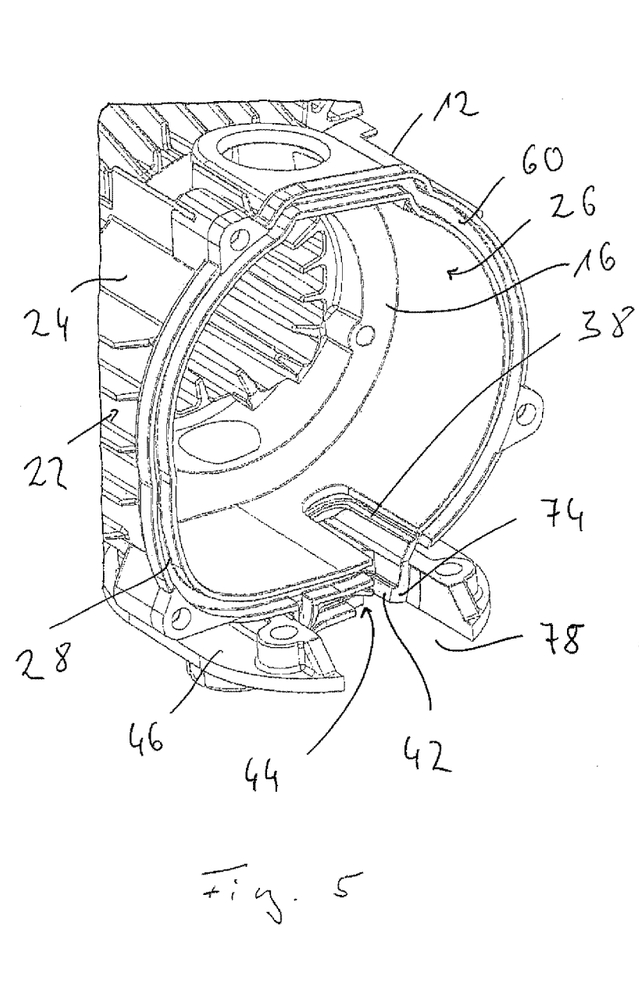
FIG. 5 is a partial perspective view of a heat exchanger housing of the vehicle heater according to FIG. 1.

An opening 68 is formed on the second sealing formation area 62 in association with the fuel feed line 36. As can be seen in FIG. 2, the fuel feed line 36 may have a radial expansion in the area in which it passes through the opening 68, so that it is guaranteed that the second sealing formation area 62 is in contact with the outer circumference of the fuel feed line 36 under a prestress due to the elasticity of the material of which the sealing element 54 is made and establishes an essentially fluid-tight closure there.

The sealing element 54 further has as an integral part a third sealing formation area 70. This extends in a ring-shaped or arc-shaped manner on the outer side of the ring-shaped first sealing formation area 58 and surrounds the buffer chamber 40, which is open basically in the direction of the blower housing 32. The third sealing formation area 70 is thus located, in the axial direction, between another sealing surface 72 adjoining the sealing surface 34 of the blower housing 32 and an end face 74 of the buffer chamber wall 42, which latter end face is located axially opposite this other sealing surface 72.

The third sealing formation area 70 also forms an integral part of the sealing element 54, so that it is guaranteed that a tight connection is achieved by integral configuration in the areas in which the different sealing formation areas 58, 62, 70 adjoin each other. In the assembled state, the first sealing formation area 58 and the third sealing formation area 70 are thus between the housing 22 and the respective end faces 28, 74 of the circumferential wall 24 and the buffer chamber wall 42, on the one hand, and the sealing surfaces 34, 72 of the blower housing 32, which are axially opposite these. The second sealing formation area 62 meshes with the fuel feed line passage opening 38 and establishes a third closure between the buffer chamber 40 and the combustion air flow space 26. Before the insertion of the combustion chamber assembly unit 18, the fuel feed line 36 can be positioned such that it passes through the opening 68 in the second sealing formation area 62, so that when the combustion chamber assembly unit 18 is inserted and the fuel feed line 36 is inserted in the process into the axially open openings 38, 44, the sealing element 54 with the second sealing formation area 62 is also inserted into the fuel feed line passage opening 38 until the first sealing formation area 58 is positioned at the end face 28 such that it meshes, for example, with the groove 60 and the third sealing formation area 70 is positioned such that it is in contact with the end face 74 of the buffer chamber wall 42. The blower housing 32 can then be moved axially to the housing 22 until the latter comes into contact with its sealing surfaces 34, 72 with the first sealing formation area 58 and with the third sealing formation area 70. A spike 76 provided on the blower housing 32 meshes in this state with the buffer chamber 40 and forms an axial support for the fuel feed line 36. In this state, the combustion air feed pipe 52 is in a recess 78 of the mounting area 46, over which the plate-shaped seal 48 can then be pushed.

While specific embodiments of the invention have been shown and described in detail to illustrate the application of the principles of the invention, it will be understood that the invention may be embodied otherwise without departing from such principles.

What is claimed is:

1. A vehicle heater comprising:
 a combustion chamber assembly unit to be fed with fuel and combustion air;
 a housing with a circumferential wall defining a combustion air flow space;
 a combustion air blower with a blower housing adjoining an end face of the circumferential wall of the housing in a direction of a housing longitudinal axis, the combustion air blower for delivering combustion air into the combustion air flow space;
 a fuel feed line adjoining the combustion chamber assembly unit for feeding fuel to the combustion chamber assembly unit, wherein a fuel feed line passage opening is provided in the circumferential wall, which fuel feed line passage opening is open towards the end face of the circumferential wall; and
 a sealing formation with a first sealing formation area arranged between the end face of the circumferential wall and the blower housing for establishing an essentially fluid-tight closure between the end face of the circumferential wall and the blower housing, and with a second sealing formation area positioned such that the second sealing formation area meshes with the fuel feed line passage opening to establish an essentially fluid-tight closure between the circumferential wall and the fuel feed line, wherein the sealing formation comprises a sealing element providing the first sealing formation area and the second sealing formation area as integral components thereof.

2. The vehicle heater in accordance with claim 1, wherein the first sealing formation area comprises a ring-shaped configuration adapted to a circumferential contour of the circumferential wall.

3. The vehicle heater in accordance with claim 2, wherein:
the second sealing formation area extends from the first sealing formation area, projecting essentially in the direction of the housing longitudinal axis and meshing with the fuel feed line passage opening, and
the second sealing formation area comprises an outer circumferential contour adapted to a contour of the fuel feed line passage opening.

4. The vehicle heater in accordance with claim 3, wherein:
a buffer chamber is provided on the housing in an area of the fuel feed line passage opening on an outer side of the circumferential wall;
the buffer chamber is open at the end face of the circumferential wall in the direction of the housing longitudinal axis and is defined radially inwardly by the circumferential wall and is defined radially outwardly and in the circumferential direction by a buffer chamber wall adjoining the circumferential wall;
the buffer chamber wall has an opening through which the fuel feed line passes; and
the second sealing formation area establishes an essentially fluid-tight closure between the buffer chamber and the combustion air flow space in an area of the circumferential wall.

5. The vehicle heater in accordance with claim 4, wherein:
the sealing formation further has a third sealing formation area; and
the third sealing formation area is arranged between the buffer chamber wall and the blower housing to establish an essentially fluid-tight closure between the buffer chamber wall and the blower housing.

6. The vehicle heater in accordance with claim 5, wherein the sealing element provides the third sealing formation area.

7. The vehicle heater in accordance with claim 1, wherein:
the second sealing formation area extends from the first sealing formation area, projecting essentially in the direction of the housing longitudinal axis and meshing with the fuel feed line passage opening, and
the second sealing formation area comprises an outer circumferential contour adapted to a contour of the fuel feed line passage opening.

8. The vehicle heater in accordance with claim 1, wherein the second sealing formation area has an opening through which the fuel feed line passes.

9. The vehicle heater in accordance with claim 1, wherein:
a buffer chamber is provided on the housing in an area of the fuel feed line passage opening on an outer side of the circumferential wall;
the buffer chamber is open at the end face of the circumferential wall in the direction of the housing longitudinal axis and is defined radially inwardly by the circumferential wall and is defined radially outwardly and in the circumferential direction by a buffer chamber wall adjoining the circumferential wall;
the buffer chamber wall has an opening through which the fuel feed line passes; and
the second sealing formation area establishes an essentially fluid-tight closure between the buffer chamber and the combustion air flow space in an area of the circumferential wall.

10. The vehicle heater in accordance with claim 9, wherein:
the sealing formation further has a third sealing formation area; and
the third sealing formation area is arranged between the buffer chamber wall and the blower housing to establish an essentially fluid-tight closure between the buffer chamber wall and the blower housing.

11. The vehicle heater in accordance with claim 10, wherein the sealing element provides the third sealing formation area.

12. The vehicle heater in accordance with claim 1, wherein the sealing element is made of an elastomeric material.

13. The vehicle heater in accordance with claim 1, wherein the housing is a part of a heat exchanger housing and that the combustion chamber assembly unit is carried on a bottom area of the heat exchanger housing.

14. A vehicle heater comprising:
a circumferential wall defining a combustion air flow space, said circumferential wall having an axial end defining an axial opening, said circumferential wall defining a fuel line opening in a circumferential surface of said circumferential wall, said fuel line opening being open at said axial end of said circumferential wall;
a combustion air blower with a blower housing mounted on said axial end of said circumferential wall, said combustion air blower being configured to deliver combustion air into said combustion air flow space;
a fuel line passing through said fuel line opening in said circumferential wall;
a seal having a first area arranged between said axial end of said circumferential wall and said blower housing, said seal having a second area configured to mesh with said fuel line opening to establish an essentially fluid-tight closure between said circumferential wall and said fuel line, said seal being one piece providing said first area and said second area as integral components thereof.

15. A heater in accordance with claim 14, wherein:
said circumferential wall has an end face at said axial end, said end face being around said axial opening;
said fuel line opening is configured to open into said end face of said circumferential wall.

16. A heater in accordance with claim 14, wherein:
said circumferential wall has an end face at said axial end, said end face being around said axial opening;
said fuel line opening is configured to open in a direction of said end face of said circumferential wall.

17. A heater in accordance with claim 14, wherein:
said circumferential wall has an end face at said axial end, said end face being around said axial opening;
said fuel line opening is configured to be axially open in a direction of said end face of said circumferential wall.

* * * * *